S. C. MacDOWNEY.
GLASS SETTING.
APPLICATION FILED JULY 10, 1914.
1,121,565.
Patented Dec. 15, 1914.
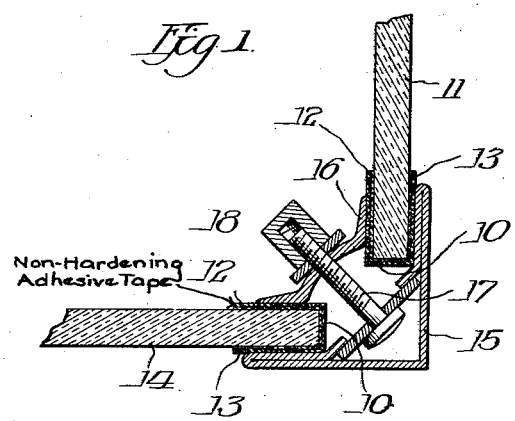
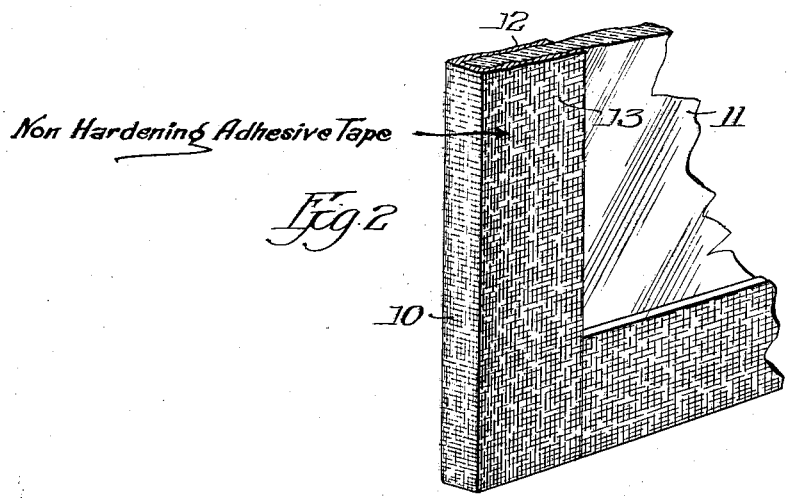

UNITED STATES PATENT OFFICE.

SILAS C. MacDOWNEY, OF CHICAGO, ILLINOIS.

GLASS SETTING.

1,121,565.   Specification of Letters Patent.   Patented Dec. 15, 1914.

Original application filed July 27, 1912, Serial No. 711,936. Divided and this application filed July 10, 1914.
Serial No. 850,115.

*To all whom it may concern:*

Be it known that I, SILAS C. MACDOWNEY, a citizen of the United States, residing at Chicago, in the county of Cook and State of Illinois, have invented certain new and useful Improvements in Glass Settings, of which the following is a specification.

My present invention pertains to the effective and satisfactory setting or securing of plates of glass in place, such for example, as are ordinarily used in store-fronts, show-cases, display-stands, etc., in such a manner as to overcome the destructive effects produced by the vibration of the glass due to wind, which not infrequently results in the breaking of the glass-plates. The continued vibration or shaking of the glass arising from the varying wind pressures has a decided and almost uncontrollable tendency to loosen the glass from its settings, such for example, as the metallic corner-bars employed where two plates come together at the corner of a show-window. Experience has shown that heretofore it has been practically impossible to prevent the glass from loosening itself from its securing-bars, which, of course, results in the expensive destruction or breaking of the plate.

I have discovered that felt, rubber, or other cushions, cement, glues, etc., employed in association with the glass-setting members are not satisfactory and will not effect the desired object of preventing the loosening and breaking of the glass. I have further discovered by practical experience and studied observation that it is necessary to use some adhesive or tacky means which of itself will secure or fasten the glass to the fastening-bar and will adhere to both, at the same time, permitting the parts to shift slightly relatively to one another to prevent destruction of the glass, and compensate for settling of the structure, the unequal expansion and contraction of the glass and the metal or other material, and the swelling and shrinking of the wood when this material is employed. The adhesive should be of such a character that it will not harden, at least when protected from the air by the glass and the fastening-means. It must be of such a nature that it will effectively adhere to both the glass and the fastening-means. It should be substantially impervious to water and moisture and not deteriorate when subjected to moisture. Means should also be provided to assure that a substantial body of the adhesive material will at all times remain between the glass and its fastening-bar, thus preventing it from being squeezed out when the glass and its fastening-means are securely drawn together.

I have found that the adhesive tape used for insulating purposes in the various electrical arts meets the above-specified requirements in the glass-setting industry. As is well known, this material comprises a textile fabric tape, impregnated or charged with an adhesive water-proof compound. I have discovered that when it is applied to the edge-portion of a plate or sheet of glass and interposed between the glass and its fastening or securing-means or bars, being coated on both faces or saturated with the compound, it will stick to both. The fabric-tape acts somewhat as a cushion and gives assurance that at all times a substantial body or thickness of the adhesive material will be between the two parts, the tape preventing the bringing or clamping of the two parts together so closely as to press out practically all of the adhesive from between the members. Furthermore, I have found that the use of such adhesive impregnated tape permits the glass and fastening-means to shift or slide slightly relatively to one another even though they are well clamped together, thus allowing the required movements of the parts due to their different coefficient of expansion and contraction, and it permits such movements without becoming detached from or unadhered to either the glass or the fastening-bar or strip. It thus prevents creeping of the parts away from one another, but, nevertheless, accommodates itself to the necessary relative movements of the parts, at the same time, preventing such slight movements from becoming detrimentally cumulative. It allows the glass and fastening-bar to come and go without releasing them so that they return to substantially their original relative positions. In this way the adhesive tape prevents the glass and securing-bars from working loose from one another, and unless so held, the glass, by its multitudinous movements, vibrations, and shiftings, loosens the holding-bar and frees itself therefrom with its resulting breakage. This adhesive or cementitious material is of such character or nature that it will not deteriorate or decompose or harden while protected from the air by the elements or parts which it secures together, and it at the same sime acts as a water-proofing medium, preventing the entrance of moisture to the window or casing. Nor is it detrimentally influenced by the water used in washing windows. I have found further that if the plate or window-glass accidentally becomes broken, requiring replacement, the sticky tape can be stripped from the old glass and effectively employed on the new.

The tape is preferably applied by hand to the edge of the glass and folded down on both sides, adhering tenaciously at all points. The fastening-means, which may vary within wide limits as to its material and form, when applied and drawn into place adheres to the exposed faces of the adhesive tape, being drawn into firm contact by any suitable style of clamping or tightening-means, as for instance, bolts and nuts.

This present application is a division of my former application, Serial No. 711,936, Plate glass fastening, filed July 27, 1912.

A desirable embodiment of the invention is illustrated in the accompanying drawing forming a part of this specification.

In this drawing: Figure 1 is a horizontal section through the corner-portion of a show-window showing fragments of the adjacent glass-plates and an associated corner-bar, the parts being equipped with the adhesive tape constituting the essence of this invention; and Fig. 2 shows a portion of the glass-plate and the manner of applying the tape thereto.

The strip of sticky tape 10 is applied to the edge of the glass-plate 11 and then pressed down on the opposite sides of the plate at 12 and 13, the nature of the tape causing it to adhere well to all of the surfaces of the glass to which it is applied. In the illustrative structure shown in Fig. 1, each of the two glass-plates 11 and 14 has its edge-portions equipped with a strip of the tape, such tape extending preferably the full length of the plate.

The two glass-plates are held together by an outer corner-bar 15 and a corresponding inner-bar 16 which are drawn together by any suitable number of bolts 17 and associated nuts 18, the bolt-heads being desirably accommodated within the outer bar, as is clearly illustrated.

It should be noted that neither the outer bar nor the companion inner bar contacts directly with the glass-plates, but rather bears against the face of the tape, as shown. The character of the cementitious or adhesive material with which the tape is charged causes the tape to stick or adhere both to the glass and to the metal corner-bars.

As has been explained above, the tape acts as a cushion between the elements, it also secures the glass and metal fastening-means directly together by its cementing or holding functions, and it is also a water-proofing medium between the parts with which it coöperates. If the corner-bar elements or parts bore directly against the glass-plates the vibration of the latter would bring about a loosening of the nuts 18 and if these were not tightened at intervals the plates of glass would free themselves entirely from the corner-bars and become broken, the bars because of their usual length, bowing or arching sufficiently to permit the plates to escape after the fastening or clamping-means has become loosened by the many vibrations of the plates.

Experience has shown that the adoption of this tape in the glass-setting art from an industry entirely foreign thereto has resulted in a vast saving of broken plates and has been found to be substantially the only means feasible for holding the glass-plates properly in association with their fastening-bars.

I claim:

1. In a glass-setting construction, the combination of a plate of glass, fastening-means for securing or holding the glass-plate in position, and adhesive tape interposed between the glass and fastening-means and adhering to both, the adhesive with which the tape is charged being substantially non-hardening when thus protected from the air by the glass and fastening-means which it sticks together, substantially as described.

2. In a glass-setting construction, the combination of a plate of glass, fastening-means for securing or holding said glass-plate in position, and adhesive tape interposed between the glass and fastening-means and adhering to both, the adhesive with which the tape is charged being substantially non-hardening when thus protected from the air by the glass and fastening-means which it sticks together, said adhesive being also substantially water-proof, thereby forming a moisture-proof joint between the glass and its fastening-means, substantially as described.

3. In a glass-setting construction, the combination of a plate of glass, fastening-means for securing or holding the plate of glass in position, and an adhesive tape strip secured to the edge of the glass-plate and overlapping one of its side-faces and interposed between the glass and the fastening-means and adhering to both, the adhesive with which the tape is charged being substantially non-hardening when thus protected from the air by the glass and fastening-means which it sticks together, the tape permitting slight relative movements of the glass and fastening-means without becoming permanently unadhered thereto, substantially as described.

In testimony whereof I have hereunto signed my name in the presence of two subscribing witnesses.

SILAS C. MacDOWNEY.

Witnesses:
    WALTER M. FULLER,
    T. D. BUTLER.